(12) United States Patent
Sheng et al.

(10) Patent No.: US 8,370,658 B2
(45) Date of Patent: *Feb. 5, 2013

(54) ADAPTIVE CONTROL OF OPERATING AND BODY BIAS VOLTAGES

(76) Inventors: Eric Chen-Li Sheng, San Jose, CA (US); Matthew Robert Ward, San Jose, CA (US)

(*) Notice: Subject to any disclaimer, the term of this patent is extended or adjusted under 35 U.S.C. 154(b) by 433 days.

This patent is subject to a terminal disclaimer.

(21) Appl. No.: 12/502,902

(22) Filed: Jul. 14, 2009

(65) Prior Publication Data

US 2010/0257389 A1    Oct. 7, 2010

Related U.S. Application Data

(63) Continuation of application No. 10/874,772, filed on Jun. 22, 2004, now Pat. No. 7,562,233.

(51) Int. Cl.
G06F 1/32  (2006.01)
G06F 1/00  (2006.01)
G06F 17/50 (2006.01)

(52) U.S. Cl. .................. 713/320; 713/300; 716/100
(58) Field of Classification Search ............ 713/300
See application file for complete search history.

(56) References Cited

U.S. PATENT DOCUMENTS

| | | |
|---|---|---|
| 5,086,501 A | 2/1992 | DeLuca et al. |
| 5,167,024 A | 11/1992 | Smith et al. |
| 5,201,059 A | 4/1993 | Nguyen |
| 5,204,863 A | 4/1993 | Saint-Joigny et al. |
| 5,218,704 A | 6/1993 | Watts, Jr. et al. |
| 5,230,055 A | 7/1993 | Katz et al. |
| 5,239,652 A | 8/1993 | Seibert et al. |
| 5,422,806 A | 6/1995 | Chen et al. |
| 5,440,520 A | 8/1995 | Schutz et al. |
| 5,447,876 A | 9/1995 | Moyer et al. |
| 5,461,266 A | 10/1995 | Koreeda et al. |
| 5,483,434 A | 1/1996 | Seesink |
| 5,495,184 A | 2/1996 | Des Rosiers et al. |
| 5,502,838 A | 3/1996 | Kikinis |
| 5,506,541 A | 4/1996 | Herndon |
| 5,511,203 A | 4/1996 | Wisor et al. |
| 5,519,309 A | 5/1996 | Smith |
| 5,560,020 A | 9/1996 | Nakatani et al. |
| 5,592,173 A | 1/1997 | Lau et al. |
| 5,682,093 A | 10/1997 | Kivela et al. |
| 5,692,204 A | 11/1997 | Rawson et al. |

(Continued)

FOREIGN PATENT DOCUMENTS

| | | |
|---|---|---|
| EP | 0381021 | 8/1990 |
| EP | 0474963 | 3/1992 |

(Continued)

OTHER PUBLICATIONS

Oner, H. at al., "A compact monitoring circuit for real-time on-chip diagnosis of hot-carrier induced degradation", Microelectronic Test Structures, 1997. ICMTS 1997. Proceedings, IEEE International Conference on Monterey, CA, Mar. 17, 1997-Mar. 20, 1997, pp. 72-76.

*Primary Examiner* — Suresh Suryawanshi

(57) ABSTRACT

Adaptive control of operating and body bias voltages. In accordance with a first embodiment of the present invention, a desirable operating frequency for the microprocessor is determined. Information stored within and specific to the microprocessor is accessed. The information can comprise coefficients of a quadratic approximation of a frequency-voltage characteristic of the microprocessor for a set of body biasing conditions. An efficient voltage for operating the microprocessor at the desirable operating frequency is computed. The microprocessor is operated at the efficient voltage and the set of body biasing conditions.

12 Claims, 10 Drawing Sheets

U.S. PATENT DOCUMENTS

| | | |
|---|---|---|
| 5,717,319 A | 2/1998 | Jokinen |
| 5,719,800 A | 2/1998 | Mittal et al. |
| 5,727,208 A | 3/1998 | Brown |
| 5,744,996 A | 4/1998 | Kotzle et al. |
| 5,745,375 A | 4/1998 | Reinhardt et al. |
| 5,752,011 A | 5/1998 | Thomas et al. |
| 5,754,869 A | 5/1998 | Holzhammer et al. |
| 5,757,171 A | 5/1998 | Babcock |
| 5,778,237 A | 7/1998 | Yamamoto et al. |
| 5,781,060 A | 7/1998 | Sugawara |
| 5,812,860 A | 9/1998 | Horden et al. |
| 5,815,724 A | 9/1998 | Mates |
| 5,818,290 A | 10/1998 | Tsukada |
| 5,825,674 A | 10/1998 | Jackson |
| 5,838,189 A | 11/1998 | Jeon |
| 5,842,860 A | 12/1998 | Funt |
| 5,848,281 A | 12/1998 | Smalley et al. |
| 5,884,049 A | 3/1999 | Atkinson |
| 5,894,577 A | 4/1999 | MacDonald et al. |
| 5,900,773 A | 5/1999 | Susak |
| 5,920,226 A | 7/1999 | Mimura |
| 5,923,545 A | 7/1999 | Nguyen |
| 5,929,621 A | 7/1999 | Angelici et al. |
| 5,933,649 A | 8/1999 | Lim et al. |
| 5,940,020 A | 8/1999 | Ho |
| 5,940,785 A | 8/1999 | Georgiou et al. |
| 5,940,786 A | 8/1999 | Steeby |
| 5,952,871 A | 9/1999 | Jeon |
| 5,974,557 A | 10/1999 | Thomas et al. |
| 5,996,083 A | 11/1999 | Gupta et al. |
| 5,996,084 A | 11/1999 | Watts |
| 5,999,040 A | 12/1999 | Do et al. |
| 6,006,169 A | 12/1999 | Sandhu et al. |
| 6,018,264 A | 1/2000 | Jin |
| 6,021,500 A | 2/2000 | Wang et al. |
| 6,035,407 A | 3/2000 | Gebara et al. |
| 6,047,248 A | 4/2000 | Georgiou et al. |
| 6,048,746 A | 4/2000 | Burr |
| 6,078,084 A | 6/2000 | Nakamura et al. |
| 6,078,319 A | 6/2000 | Bril et al. |
| 6,087,820 A | 7/2000 | Houghton et al. |
| 6,087,892 A | 7/2000 | Burr |
| 6,091,283 A | 7/2000 | Murgula et al. |
| 6,100,751 A | 8/2000 | De et al. |
| 6,118,306 A | 9/2000 | Orton et al. |
| 6,119,241 A | 9/2000 | Michail et al. |
| 6,141,762 A | 10/2000 | Nicol et al. |
| 6,157,092 A | 12/2000 | Hofmann |
| 6,202,104 B1 | 3/2001 | Ober |
| 6,216,235 B1 | 4/2001 | Thomas et al. |
| 6,218,708 B1 | 4/2001 | Burr |
| 6,226,335 B1 | 5/2001 | Prozorov |
| 6,229,379 B1 | 5/2001 | Okamoto |
| 6,232,830 B1 | 5/2001 | Fournel |
| 6,272,642 B2 | 8/2001 | Pole, III et al. |
| 6,279,048 B1 | 8/2001 | Fadavi-Ardekani |
| 6,281,716 B1 | 8/2001 | Mihara |
| 6,303,444 B1 | 10/2001 | Burr |
| 6,304,824 B1 | 10/2001 | Bausch et al. |
| 6,305,407 B1 | 10/2001 | Selby |
| 6,311,287 B1 | 10/2001 | Dischler et al. |
| 6,314,522 B1 | 11/2001 | Chu et al. |
| 6,320,453 B1 | 11/2001 | Manning |
| 6,337,593 B1 | 1/2002 | Mizuno et al. |
| 6,345,362 B1 | 2/2002 | Bertin et al. |
| 6,345,363 B1 | 2/2002 | Levy-Kendler |
| 6,347,379 B1 | 2/2002 | Dai et al. |
| 6,370,046 B1 | 4/2002 | Nebrigic et al. |
| 6,373,323 B2 | 4/2002 | Kuroda |
| 6,373,325 B1 | 4/2002 | Kuriyama |
| 6,378,081 B1 | 4/2002 | Hammond |
| 6,388,432 B2 | 5/2002 | Uchida |
| 6,415,388 B1 | 7/2002 | Browning et al. |
| 6,424,203 B1 | 7/2002 | Bayadroun |
| 6,424,217 B1 | 7/2002 | Kwong |
| 6,425,086 B1 | 7/2002 | Clark et al. |
| 6,427,211 B2 | 7/2002 | Watts, Jr. |
| 6,442,746 B1 | 8/2002 | James et al. |
| 6,457,135 B1 | 9/2002 | Cooper |
| 6,466,077 B1 | 10/2002 | Miyazaki et al. |
| 6,469,573 B2 | 10/2002 | Kanda et al. |
| 6,476,632 B1 | 11/2002 | La Rosa et al. |
| 6,477,654 B1 | 11/2002 | Dean et al. |
| 6,486,729 B2 | 11/2002 | Imamiya |
| 6,487,668 B2 | 11/2002 | Thomas et al. |
| 6,489,224 B1 | 12/2002 | Burr |
| 6,496,027 B1 | 12/2002 | Sher et al. |
| 6,496,057 B2 | 12/2002 | Wada et al. |
| 6,510,400 B1 | 1/2003 | Moriyama |
| 6,510,525 B1 | 1/2003 | Nookala et al. |
| 6,513,124 B1 | 1/2003 | Furuichi et al. |
| 6,518,828 B2 | 2/2003 | Seo et al. |
| 6,519,706 B1 | 2/2003 | Ogoro |
| 6,529,421 B1 | 3/2003 | Marr et al. |
| 6,531,912 B2 | 3/2003 | Katou |
| 6,563,371 B2 | 5/2003 | Buckley, III et al. |
| 6,570,371 B1 | 5/2003 | Volk |
| 6,574,577 B2 | 6/2003 | Stapleton et al. |
| 6,574,739 B1 | 6/2003 | Kung et al. |
| 6,600,346 B1 | 7/2003 | Macaluso |
| 6,617,656 B2 | 9/2003 | Lee et al. |
| 6,642,774 B1 | 11/2003 | Li |
| 6,675,360 B1 | 1/2004 | Cantone et al. |
| 6,677,643 B2 | 1/2004 | Iwamoto et al. |
| 6,700,434 B2 | 3/2004 | Fujii et al. |
| 6,731,221 B1 | 5/2004 | Dioshongh et al. |
| 6,737,909 B2 | 5/2004 | Jaussi et al. |
| 6,741,118 B2 | 5/2004 | Uchikoba et al. |
| 6,774,705 B2 | 8/2004 | Miyazaki et al. |
| 6,784,722 B2 | 8/2004 | Tang et al. |
| 6,791,146 B2 | 9/2004 | Lai et al. |
| 6,791,212 B2 | 9/2004 | Pulvirenti et al. |
| 6,792,379 B2 | 9/2004 | Ando |
| 6,803,633 B2 | 10/2004 | Mergens et al. |
| 6,809,968 B2 | 10/2004 | Marr et al. |
| 6,865,116 B2 | 3/2005 | Kim et al. |
| 6,882,172 B1 | 4/2005 | Suzuki et al. |
| 6,889,331 B2 | 5/2005 | Soerensen et al. |
| 6,906,582 B2 | 6/2005 | Kase et al. |
| 6,917,240 B2 | 7/2005 | Trafton et al. |
| 6,922,783 B2 | 7/2005 | Knee et al. |
| 6,927,620 B2 | 8/2005 | Senda |
| 6,967,522 B2 | 11/2005 | Chandrakasan et al. |
| 6,986,068 B2 | 1/2006 | Togawa |
| 6,992,508 B2 | 1/2006 | Chow |
| 7,012,461 B1 | 3/2006 | Chen et al. |
| 7,030,681 B2 | 4/2006 | Yamazaki et al. |
| 7,100,061 B2 | 8/2006 | Halepete et al. |
| 7,119,604 B2 | 10/2006 | Chih |
| 7,120,804 B2 | 10/2006 | Tschanz et al. |
| 7,129,771 B1 | 10/2006 | Chen |
| 7,228,242 B2 | 6/2007 | Read et al. |
| 7,362,165 B1 | 4/2008 | Chen |
| 7,953,990 B2 * | 5/2011 | Stewart et al. ............... 713/300 |
| 2001/0028577 A1 | 10/2001 | Sung et al. |
| 2002/0011650 A1 | 1/2002 | Nishizawa et al. |
| 2002/0026597 A1 | 2/2002 | Dai et al. |
| 2002/0067638 A1 | 6/2002 | Kobayashi et al. |
| 2002/0073348 A1 | 6/2002 | Tani |
| 2002/0083356 A1 | 6/2002 | Dai |
| 2002/0087219 A1 | 7/2002 | Dai |
| 2002/0087896 A1 | 7/2002 | Cline et al. |
| 2002/0116650 A1 | 8/2002 | Halepete et al. |
| 2002/0130701 A1 | 9/2002 | Kleveland |
| 2002/0138778 A1 | 9/2002 | Cole et al. |
| 2002/0140494 A1 | 10/2002 | Thomas et al. |
| 2002/0194509 A1 | 12/2002 | Plante et al. |
| 2003/0006590 A1 | 1/2003 | Aoki et al. |
| 2003/0036876 A1 | 2/2003 | Fuller, III et al. |
| 2003/0065960 A1 | 4/2003 | Rusu et al. |
| 2003/0071657 A1 | 4/2003 | Soerensen et al. |
| 2003/0074591 A1 | 4/2003 | McClendon et al. |
| 2003/0098736 A1 | 5/2003 | Uchikoba et al. |
| 2003/0189465 A1 | 10/2003 | Abadeer et al. |
| 2004/0025061 A1 | 2/2004 | Lawrence |
| 2004/0073821 A1 | 4/2004 | Naveh et al. |
| 2004/0103330 A1 | 5/2004 | Bonnett |

| | | | | | | |
|---|---|---|---|---|---|---|
| 2004/0108881 | A1 | 6/2004 | Bokui et al. | JP | 63223480 | 9/1988 |
| 2004/0246044 | A1 | 12/2004 | Myono et al. | JP | 04114365 | 4/1992 |
| 2005/0225376 | A1 | 10/2005 | Kin | JP | 409185589 | 7/1997 |
| 2007/0283176 | A1 | 12/2007 | Tobias et al. | JP | 11118845 | 4/1999 |
| | | | | JP | 2000172383 | 6/2000 |
| | | | | JP | 2001345693 | 12/2001 |
| | | | | JP | 2003324735 | 11/2003 |

FOREIGN PATENT DOCUMENTS

| | | |
|---|---|---|
| EP | 0501655 | 9/1992 |
| EP | 0504655 | 9/1992 |
| EP | 0624909 | 11/1994 |
| EP | 0976781 | 2/2000 |
| EP | 1398639 | 3/2004 |
| WO | 0127728 | 4/2001 |
| WO | 0238828 | 5/2002 |
| WO | 2004061634 | 7/2004 |

* cited by examiner

300

ADAPTIVE CONTROL OF OPERATING AND BODY BIAS VOLTAGES

RELATED APPLICATIONS

This is a Continuation Application of, and claims benefit to, commonly owned U.S. patent application Ser. No. 10/874,772, now U.S. Pat. No. 7,562,233, entitled "Adaptive Control of Operating and Body Bias Voltages" to Sheng and Ward, filed Jun. 22, 2004, which is hereby incorporated herein by reference in its entirety.

Commonly-owned U.S. patent application Ser. No. 10/334,272, now U.S. Pat. No. 6,936,898, filed Dec. 31, 2002, entitled "Diagonal Deep Well Region for Routing Body-Bias Voltage for MOSFETs in Surface Well Regions" to Pelham and Burr, is hereby incorporated herein by reference in its entirety.

Co-pending commonly-owned U.S. patent application Ser. No. 10/334,918 filed Dec. 31, 2002, entitled "Adaptive Power Control" to Burr et al., is hereby incorporated herein by reference in its entirety.

FIELD OF THE INVENTION

Embodiments in accordance with the present invention relate to the manufacture and operation of integrated circuits. More particularly, embodiments of the present invention relate to computer-implemented processes for operating an integrated circuit at efficient voltages customized for that integrated circuit.

BACKGROUND

In order to operate an integrated circuit, e.g., a microprocessor, in an efficient manner, for example, to consume a low amount of energy to accomplish a task, it is known to adjust various controlling parameters. These parameters may include an operating voltage or body-biasing voltage(s) that can be adjusted to a value characteristic of an advantageous power condition in accordance with the task to be accomplished. For example, an operating voltage is set to a minimized value consistent with a desired frequency of operation. Such controlling parameters are conventionally determined, e.g., via a lookup table, based upon characteristics of a manufacturing population of integrated circuits.

Unfortunately, numerous characteristics related to power consumption of an integrated circuit, e.g., a microprocessor, are highly variable across a manufacturing process. For example, maximum operating frequency, threshold voltage and capacitance may each vary by 30% or more, from batch to batch and even within the same wafer. Leakage current is exponential with threshold voltage and may vary by 500% from nominal. Conventional methods of determining controlling parameters are typically based upon the worst case operation of a population of processor devices, determined, e.g., during a qualification process, generally prior to general availability of the integrated circuit devices. Consequently, many or most of a manufactured population of integrated circuits are capable of more efficient operation. Unfortunately, such conventional methods of determining controlling parameters do not enable such enhanced efficient behavior from such integrated circuits.

SUMMARY OF THE INVENTION

Therefore, adaptive control of operating and body bias voltages is highly desired.

Accordingly, systems and methods employing adaptive control of operating and body bias voltages are disclosed. In accordance with a first embodiment of the present invention, a desirable operating frequency for the microprocessor is determined. Information stored within and specific to the microprocessor is accessed. The information can comprise coefficients of a quadratic approximation of a frequency-voltage characteristic of the microprocessor for a set of body biasing conditions. An operating voltage for operating the microprocessor at the desirable operating frequency is computed. The microprocessor is operated at the operating voltage and the set of body biasing conditions.

DETAILED DESCRIPTION OF THE INVENTION

Figure 1:
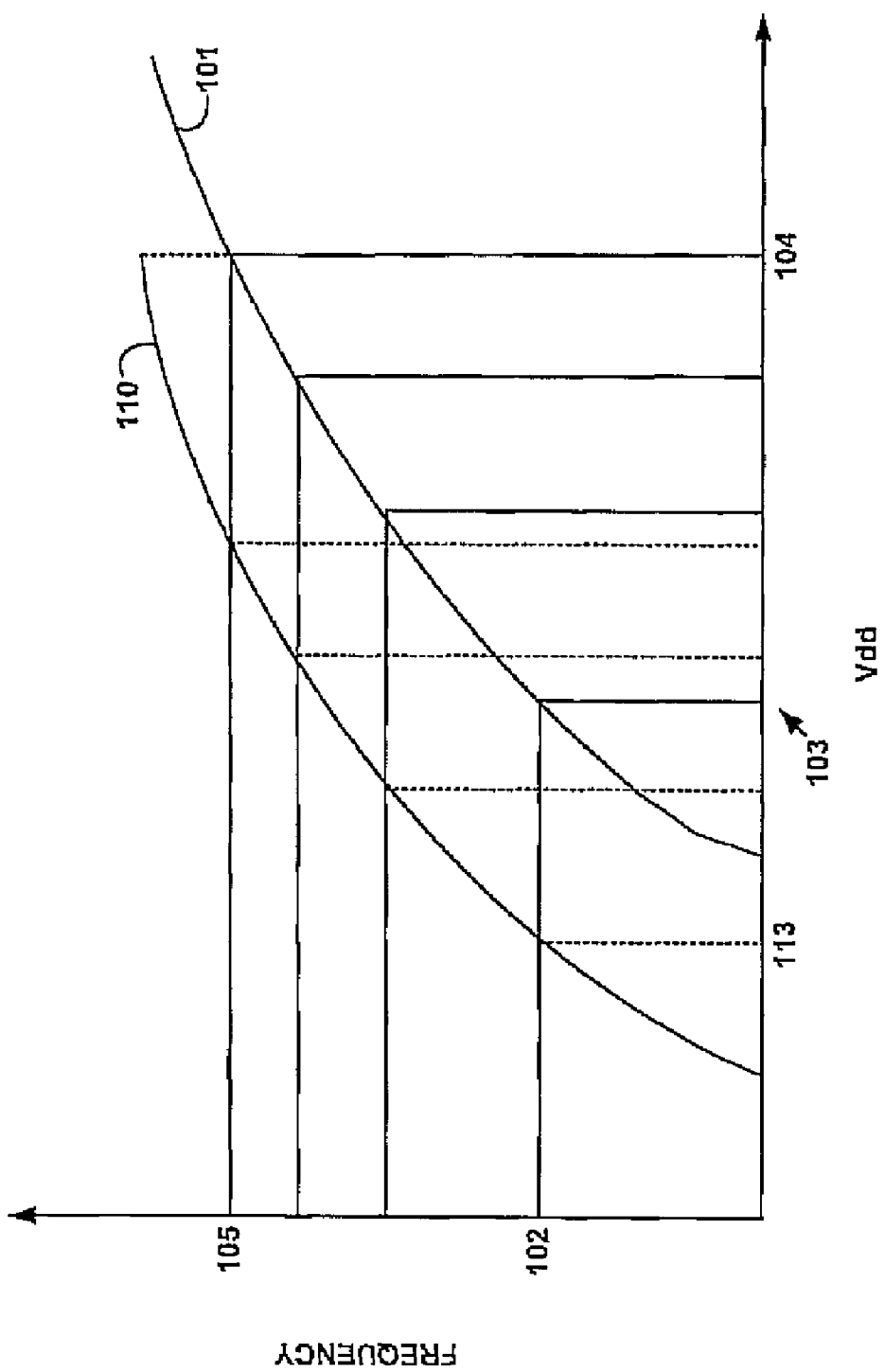
FIG. 1 illustrates an exemplary frequency-voltage characteristic of a specific integrated circuit, according to an embodiment of the present invention.

In the following detailed description of the present invention, adaptive control of operating and body bias voltages, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions which follow (e.g., processes 200, 300, 700, 800, 900 and 1000) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions or firmware leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "indexing" or "processing" or "computing" or "translating" or "calculating" or "determining" or "selecting" or "storing" or "recognizing" or "generating" or "selecting" or "moving" or "encoding" or "combining" or "testing" of "setting" or "operating" or "transforming" or "determining" or "optimizing" or "synthesizing" or "grouping" or "estimating" or "describing" or "measuring" or "recording" or "associating" or the like, refer to the action and processes of a computer system, processor, or similar electronic computing device, that manipulates and transforms data represented as physical (electronic) quantities within the computer system's registers and memories into other data similarly represented as physical quantities within the computer system memories or registers or other such information storage, transmission or display devices.

Adaptive Control of Operating Voltage

Embodiments in accordance with the present invention are described in the context of design and operation of integrated semiconductors. More particularly, embodiments of the present invention relate to adaptive control of operating and body bias voltages. It is appreciated, however, that elements of the present invention may be utilized in other areas of semiconductor design and operation.

The following description of embodiments in accordance with the present invention illustrates coupling a body-bias voltage to pFETs (or p-type metal oxide semiconductor field effect transistors (MOSFETS)) formed in surface N-wells and/or coupling a body-bias voltage to nFETs (or n-type MOSFETS) formed in surface P-wells when a p-type substrate and an N-well process are utilized. It is to be appreciated, however, that embodiments in accordance with the present invention are equally applicable to coupling body-biasing voltage(s) to nFETs (or n-type MOSFETS) formed in surface P-wells and/or to pFETs (or p-type MOSFETS) formed in surface N-wells when an n-type substrate and a P-well process are utilized. Consequently, embodiments in accordance with the present invention are well suited to semiconductors formed in both p-type and n-type materials, and such embodiments are considered within the scope of the present invention.

A semiconductor manufacturing process is generally considered to be highly self-consistent, that is, the process is very good at producing "exact" copies of an integrated circuit design. This is especially the case for semiconductor products operated in the digital domain. Functionally, the semiconductor arts have succeeded in generally producing many copies that function similarly.

However, numerous analog characteristics of a semiconductor are highly variable, which can lead to varied analog function/performance from chip to chip. For example, threshold voltage, capacitance, gate delay, current consumption, minimum operating voltage and maximum operating frequency may vary 30% or more from chip to chip. Leakage, or "off" current may be even more variable. For example, it is not uncommon for leakage current to vary 500% above or below a nominal level. More particularly, parameters related to power consumption of an integrated circuit are highly variable.

FIG. 1 illustrates an exemplary frequency-voltage characteristic of a specific integrated circuit, according to an embodiment of the present invention. Also shown for reference is standard frequency-voltage curve 101 for the operation of a population of integrated circuits, according to the conventional art. Curve 101 indicates the required supply voltage Vdd to achieve a desired frequency of operation of the population of integrated circuits. For example, in order to operate at frequency 102, a supply voltage 103 is required.

Curve 101 may generally be established as a standard for a population of microprocessors, e.g., by collecting frequency versus voltage information for a number of microprocessor samples. By using a variety of well known statistical analysis methods, curve 101 may be established to achieve a desirable trade-off of performance and process yield. For example, curve 101 may be established such that 90% of all production exhibits better frequency-voltage performance than curve 101. Using curve 101, a set of frequency-voltage operating points may be established.

Curve 110 illustrates measured and/or predicted frequency-voltage characteristics corresponding to a specific integrated circuit out of a manufactured population. It is to be appreciated that the frequency-voltage characteristic displayed in frequency-voltage characteristic 110 is different from standard curve 101, reflecting variations in results of a manufacturing process.

Frequency-voltage characteristic 110 represents a specific integrated circuit with frequency-voltage characteristics that are "better" than standard curve 101. For example, the integrated circuit represented by curve 110 is able to achieve frequency 102 at supply voltage 113, which is less than supply voltage 103, indicated by curve 101. As a beneficial result, such an integrated circuit (represented by curve 110) could provide the same level of processing performance (represented by frequency) at a lower voltage (e.g., voltage 113) and consequently lower power compared to operating at a standard voltage (e.g., voltage 103 given by curve 101).

Frequency-voltage characteristic 110 represents an integrated circuit with a frequency-voltage characteristic that is more desirable than the standard curve 101. Typically, a majority of a manufacturing population will have superior frequency-voltage characteristics, as a standard curve is determined, at least in part, to maximize the yield of the manufacturing process. A deleterious effect of such a standard frequency-voltage characteristic, however, is that most of the integrated circuits are capable of better power performance than they are rated. Consequently, when operated according to conventional art frequency-voltage characteristic 101, they consume more power than necessary.

Since performance in terms of power consumption is a critical attribute for many integrated circuits, e.g., a mobile processor, integrated circuit manufacturers typically test and certify that a part will meet a particular clock rate at a maximum power level. When operating with a conventional art set of frequency-voltage operating points, such a maximum power level must be achieved at a voltage corresponding to the desired frequency where the voltage is specified by a set of frequency-voltage operating points of the conventional art.

For example, the power level of an integrated circuit must be less than the maximum limit for frequency 105 at supply voltage 104.

Testing of integrated circuits at typical operating frequencies, e.g., a few hundred megahertz into the gigahertz range, such as the testing required to generate curve 110, is generally performed after an integrated circuit has been packaged. Test fixtures required to test a packaged part are generally less expensive than test fixtures required to test at a bare die or wafer level. In addition, the packaging, including, for example a lead frame, introduces numerous additional electrical and thermal characteristics that may affect the performance, particularly the frequency performance, of a packaged device.

Unfortunately, the packaging process is expensive, in the form of packaging materials, operating expenses and capacity of process equipment. If a packaged semiconductor is found to have undesirable power characteristics after packaging, the expense of packaging the device is lost. In addition, certain types of non-volatile elements of a semiconductor, e.g., data storage fuses, may typically be set only prior to packaging. For example, a data storage fuse may be a semiconductor structure that is directly accessed, e.g., via laser, or is accessed via pads that are generally not bonded out. For these and other reasons it is frequently desirable to determine power performance of an integrated circuit prior to packaging.

Power consumed by CMOS circuitry is comprised of two components, a static portion and a dynamic portion. Dynamic power is given approximately by $p=CV^2f$, where C is the active switching capacitance, V is the supply voltage, and f is the frequency of operation, and static power is expressed as idle current times voltage. As described previously, it is typically not possible to accurately test an integrated circuit at frequency prior to packaging. Consequently, dynamic power may not generally be measured accurately prior to packaging of an integrated circuit. However, capacitance, C, and idle current are relatively unaffected by packaging and may be accurately measured at a bare die and/or wafer level.

Advantageously, given capacitance, dynamic power may be estimated prior to packaging based upon an assumed operating frequency, according to an embodiment of the present invention. For example, based upon a measured value for capacitance, dynamic power may be estimated for a desired frequency of operation. An operating voltage may be specified, for example, per a standard frequency-voltage operating point. Further, since idle current may be measured on an unpackaged device, total power (at a desired operating frequency) may be directly estimated.

According to an embodiment of the present invention, such an estimation of power consumption (for a desired operating frequency) can be used to predict an operating voltage frequency relationship of a specific integrated circuit based upon testing performed on the specific integrated circuit prior to packaging.

In accordance with embodiments of the present invention, a representation of such resulting voltage frequency relationship of a specific integrated circuit may be encoded, e.g., programmed, into a non-volatile element, e.g., a data storage fuse (e.g., a non-resetable semiconductor feature), electrically erasable programmable read only memory (EEPROM) or the like, of the integrated circuit.

In accordance with embodiments of the present invention, a frequency-voltage characteristic of a specific integrated circuit e.g., frequency-voltage characteristic 110, may be approximated by a quadratic function. Parameters of such a quadratic function can be encoded into the integrated circuit. During operation of the integrated circuit, the previously encoded parameters can be accessed and utilized to determine an advantageous operating voltage for the integrated circuit. In general, operating an integrated circuit at an operating voltage determined based upon a representation of actual test results corresponding to the specific integrated circuit, will enable lower power operation of the specific integrated circuit, in comparison to operation of the same integrated circuit according to a standard frequency-voltage characteristic.

In actual operation of an integrated circuit, e.g., a microprocessor, frequency is generally better viewed as an independent variable. For example, for a given desired frequency, it is desirable to determine a minimum operating voltage required to function at that frequency. It is appreciated that such a relationship is the inverse of the relationships presented in FIG. 1.

A frequency-voltage relationship for a specific integrated circuit with frequency as the independent variable may be approximated in the form of Relation 1, below:

$$Vdd=af^2+bf+c \qquad \text{(Relation 1)}$$

where f is the desired frequency of operation, a and b are coefficients of the quadratic equation, c is a constant and Vdd is the minimum operating voltage required for the particular integrated circuit to operate at the desired operating frequency, f.

Thus, by encoding coefficients a and b, and a constant c into each integrated circuit, e.g., via data storage fuses, or other non-volatile memory cells, each integrated circuit can carry information of its characteristic frequency-voltage relationship, e.g., from a manufacturing test, to its operating environment, e.g., installed in a computer system. When it is desirable to operate the integrated circuit, e.g., a microprocessor, at a particular frequency, these parameters can be accessed and used in a calculation comprising Relation 1 to determine an operating voltage. As a beneficial consequence, the integrated circuit will generally be able to operate more efficiently, e.g., consume less power, than under the conventional art.

It is to be appreciated that other representations of a quadratic approximation of a frequency-voltage characteristic of an integrated circuit are well suited to embodiments in accordance with the present invention. For example, rather than encode the constant c of Relation 1, a specific point along the curve can be encoded.

In accordance with embodiments of the present invention, the minimum voltage required for the predicted maximum operating frequency of the integrated circuit is encoded into the integrated circuit. It is appreciated that operating at a predicted maximum operating frequency is generally a very critical point of performance for an integrated circuit. For example, if operating voltage is too low, such predicted maximum operating frequency may not be achieved. Further, if operating voltage is too high, then power consumption is increased in the region of maximum power consumption. Increased power consumption is highly detrimental in terms of its effects upon battery life. In addition, such excessive power consumption can lead to excessive self-heating of an integrated circuit, potentially leading to reduced reliability and/or catastrophic failure.

As a beneficial result of specifying the minimum voltage required for the predicted maximum operating frequency of the integrated circuit, any errors resulting from the use of a quadratic approximation of a frequency-voltage characteristic and/or calculation errors are reduced or eliminated in this critical performance region.

It is to be appreciated that a representation of a frequency-voltage characteristic determined in a post-packaging test of an integrated circuit can be encoded in non-volatile memory, e.g., within an integrated circuit or its packaging. Such post-packaging testing will generally produce more accurate characterizations as the impact of the packaging can be measured, rather than predicted. Embodiments in accordance with the present invention are well suited to encoding such frequency-voltage characteristics determined in post-packaging testing.

It is to be further appreciated that operating temperature of an integrated circuit is an important influence on a frequency-voltage characteristic of the integrated circuit. In general, frequency-voltage characteristics of an integrated circuit will vary according to operating temperature. For example, the higher an integrated circuit's operating temperature, the higher the operating voltage required to achieve a given operating frequency. In accordance with embodiments of the present invention, a measured frequency-voltage characteristic of an integrated circuit (either pre- or post-packaging) is adjusted for any difference between a test temperature and an operating temperature specified for operating at a maximum operating frequency. It is appreciated that such temperature is not necessarily a maximum operating temperature.

In accordance with an embodiment of the present invention, an additional parameter known as a "conservation factor" may also encoded into non-volatile memory associated with the integrated circuit. The conservation factor is a voltage offset that can be utilized to account for inaccuracies in an encoded frequency-voltage characteristic versus an actual frequency-voltage characteristic for an integrated circuit. For example, an encoded frequency-voltage characteristic can comprise predictions for packaging and/or temperature difference effects. The conservation factor can be utilized to ensure that an operating voltage determined according to an encoded frequency-voltage characteristic is not too low for the actual integrated circuit to operate at the desired frequency. For example, the conservation factor is utilized to increase the operating voltage from an operating voltage determined from the encoded frequency-voltage characteristic of that integrated circuit.

Yet another parameter known as a "frequency guardband" may also encoded into non-volatile memory associated with the integrated circuit. The frequency guardband is a frequency percentage that can be utilized to account for inaccuracies in an encoded frequency-voltage characteristic versus an actual frequency-voltage characteristic for an integrated circuit. For example, an encoded frequency-voltage characteristic can comprise predictions for packaging and/or temperature difference effects. The frequency guardband can be utilized to ensure that an operating voltage determined according to an encoded frequency-voltage characteristic is not too low for the actual integrated circuit to operate at the desired frequency. For example, the frequency guardband is utilized to increase the desired operating frequency to form a computation-input frequency. The computation-input frequency can be utilized to determine an operating voltage from a frequency-voltage characteristic of that integrated circuit. It is appreciated that utilizing a computation-input frequency, representing an increased operating frequency, to determine an operating voltage will generally result in an operating voltage that is somewhat higher than an operating voltage determined for the desired, e.g., non-increased, operating frequency.

Table 1, below, illustrates exemplary values of the parameters discussed previously, as they might be encoded in non-volatile memory, e.g., data storage fuses, of an integrated circuit, in accordance with embodiments of the present invention. Units are included parenthetically for explanation; it is appreciated that such units are generally not included in a non-volatile memory structure.

TABLE 1

| Parameter | Value |
|---|---|
| Predicted Maximum Frequency | 1200 (MHz) |
| Voltage for Predicted Maximum Frequency | 1350 (mV) |
| Coefficient "a" | 0.000508 |
| Coefficient "b" | 0.10314 |
| Frequency Guardband | 3 (%) |
| Conservation Factor | 3 |

Relation 1, above, can be utilized to compute an efficient operating voltage as shown in Relation 2, below:

$$Vdd = af^2 + bf - (af_{max}^2 + bf_{max}) + Vf_{max}$$ (Relation 2)

where f is the desired frequency of operation, a and b are coefficients of the quadratic equation, $f_{max}$ is the predicted maximum frequency of operation, $Vf_{max}$ is the operating voltage needed for operation at $f_{max}$ and Vdd is the minimum operating voltage required for the particular integrated circuit to operate at the desired operating frequency, f.

It is appreciated that subtracting a computed value for $f_{max}$ and then adding $Vf_{max}$ utilizes a point ($f_{max}$, $Vf_{max}$) on the voltage-frequency characteristic and eliminates a requirement for a constant "c" in the calculation. Use of such a constant is well suited to embodiments in accordance with the present invention.

Relation 3, below, can be used to incorporate the concepts of frequency guardband and conservation factor into the computation of an operating voltage. It is appreciated that frequency guardband and conservation factor will generally increase an operating voltage determined for a desired operating frequency.

$$Vdd = a((1+Fgb)f)^2 + b((1+Fgb)f) - (af_{max}^2 + bf_{max}) + Vf_{max} + Vc$$ (Relation 3)

where f is the desired frequency of operation, a and b are coefficients of the quadratic equation, $f_{max}$ is the predicted maximum frequency of operation, $Vf_{max}$ is the operating voltage needed for operation at $f_{max}$, Fgb is a frequency guardband, Vc is a voltage conservation factor, and Vdd is an efficient operating voltage required for the particular integrated circuit to operate at the desired operating frequency, f.

An additional optional term known as a voltage conservation multiplier, can be supplied by a computer system. For example, a voltage conservation multiplier enables computer system engineers to adjust the effect of a conservation factor programmed in an integrated circuit. Such a voltage conservation multiplier can be useful in adjusting power-performance requirements of microprocessors in different computer systems. For example, in a computer system requiring highest power efficiency from a microprocessor, a voltage conservation multiplier may be set to zero. Consequently, a conservation factor would not affect an operating voltage determination. However, such a setting could require a very select population of microprocessors capable of performing very efficiently. Such a population will generally command a price premium.

In contrast, for a computer system requiring less power efficiency from a microprocessor, a voltage conservation multiplier could be set to a finite value, e.g., one. Consequently, a conservation factor would have an effect, and serve to increase an operating voltage determination. In such a case, a larger population of microprocessors would be available for use in such a computer system, and the microprocessors could generally be obtained at less cost.

For example, using the exemplary value parameters of Table 1 (with a system-supplied voltage conservation multiplier of zero), an efficient operating voltage for a desired operating frequency of 1.1 GHz (1100 MHz) can be computed as follows:

$$Vdd=0.000508((1.03)1100)^2+10314((1.03)1100)-\\(0.000508(1200)^2+10314(1200))+1350+3(0)$$

≈1264 mV

It is to be appreciated that practical variable voltage power supplies generally have finite voltage adjustment capacity or granularity, for example a step size of 25 mV or 50 mV. Generally, a practical efficient operating voltage should be set to the next step above the computed voltage. For example, the actual operating voltage should be set to the next step of the power supply equal to or higher than the result from Relation 2.

It is to be further appreciated that knowledge of characteristics of a variable voltage power supply to be used with an integrated circuit, e.g., voltage step size and/or voltage tolerance, can be utilized in a test program of the integrated circuit. Such information can be reflected in the information, e.g., coefficients "a" and/or "b" of a quadratic approximation of a frequency-voltage characteristic of the integrated circuit. In such a manner, a test program of the integrated circuit can determine an operating voltage for the integrated circuit in the same manner as an operating voltage for the integrated circuit would be determined in a target environment, e.g., a computer system.

Figure 2:
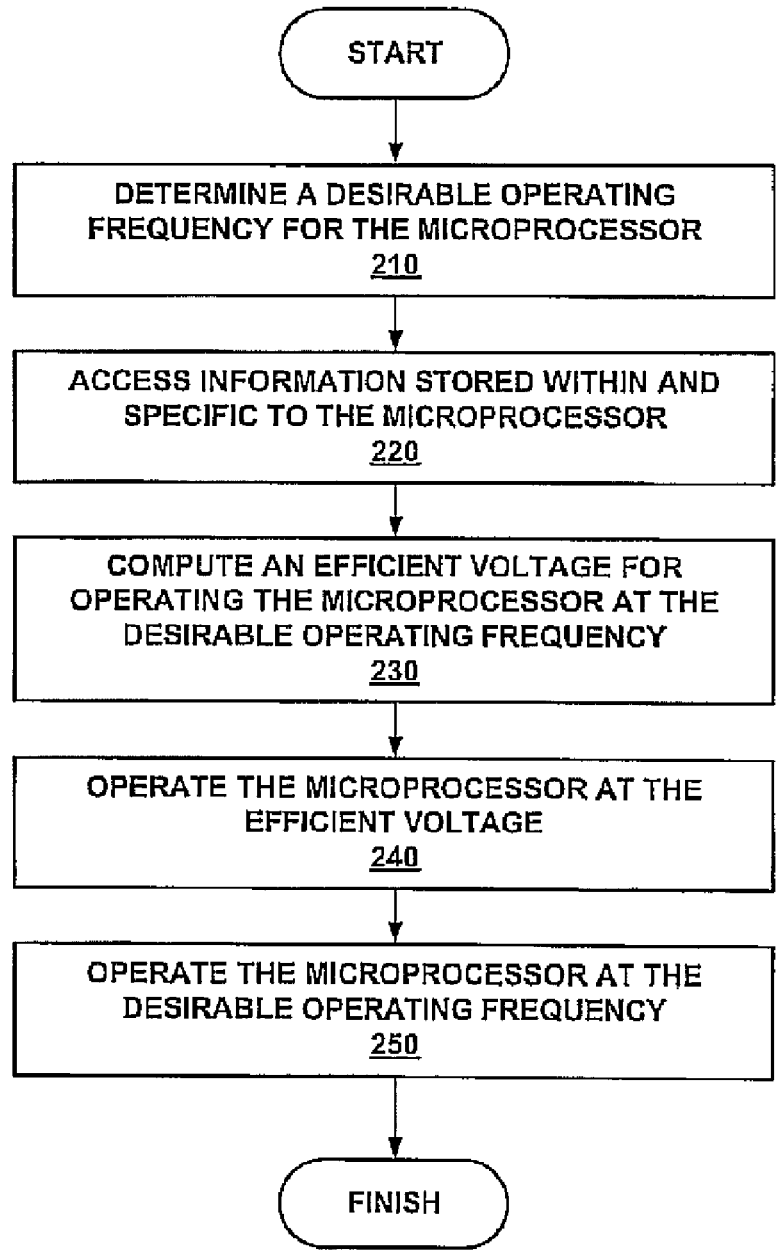
FIG. 2 illustrates a method of operating a microprocessor, in accordance with embodiments of the present invention.

FIG. 2 illustrates a method 200 of operating a microprocessor, in accordance with embodiments of the present invention. In block 210, a desirable operating frequency for the microprocessor is determined. One typical means of determining a desirable frequency is based upon the processing needs of software executing on the microprocessor.

In block 220, information stored within and specific to the microprocessor is accessed. The information can, for example, be programmed into a non-volatile element, e.g., a data storage fuse (e.g., a non-resetable semiconductor feature), electrically erasable programmable read only memory (EEPROM) or the like, of the microprocessor. In one implementation, the storage device is integrated with the processor.

In block 230, an efficient voltage for operating the microprocessor at the desirable operating frequency is computed utilizing the information. For example, a quadratic approximation of a frequency-voltage characteristic of the microprocessor, e.g., Relation 1, can be evaluated. It is appreciated that other approximations of a frequency-voltage characteristic of a microprocessor, e.g., of linear, cubic or higher order, are well suited to embodiments in accordance with the present invention.

In block 240, the microprocessor is operated at the efficient voltage. For example, a variable voltage power supply providing an operating voltage to the microprocessor can be commanded to supply the efficient voltage. In optional block 250, the microprocessor is operated at the desirable operating frequency while operating at the efficient voltage. In this novel manner, a microprocessor can be operated in accordance with its specific voltage-frequency characteristic in a more power efficient manner than is available under the conventional art.

Figure 3:
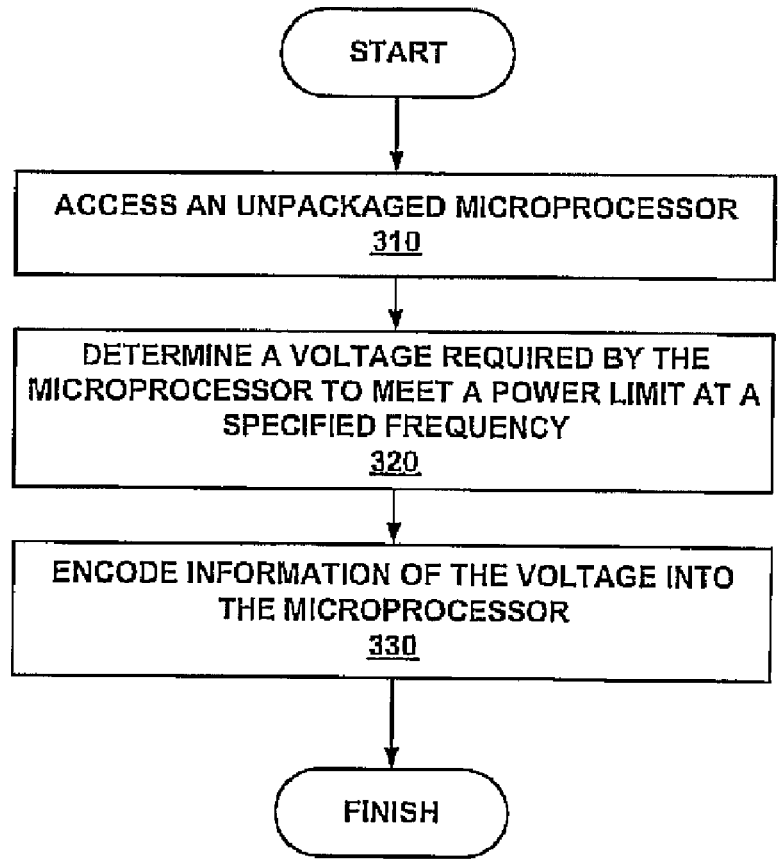
FIG. 3 illustrates a method of manufacturing a microprocessor, in accordance with embodiments of the present invention.

FIG. 3 illustrates a method 300 of manufacturing a microprocessor, in accordance with embodiments of the present invention. In block 310, an unpackaged microprocessor is accessed. It is appreciated that "packaging" and like terms refer to semiconductor packaging, e.g., a pin grid array package, rather than shipping or consumer packaging. The microprocessor may be in wafer form. The microprocessor may also have been separated from a wafer.

In block 320, a voltage required by said microprocessor to meet a power limit at a specified frequency is determined. The voltage may be determined by measuring capacitance and/or idle current of the microprocessor.

In block 330, information of said voltage is encoded into the microprocessor. Embodiments of the present invention are well suited to a wide variety of well known types of storage that may be a part of a microprocessor and encoded in block 830. Examples include, without limitation, data storage fuses and electrically erasable read only memory and the like.

Figure 5:
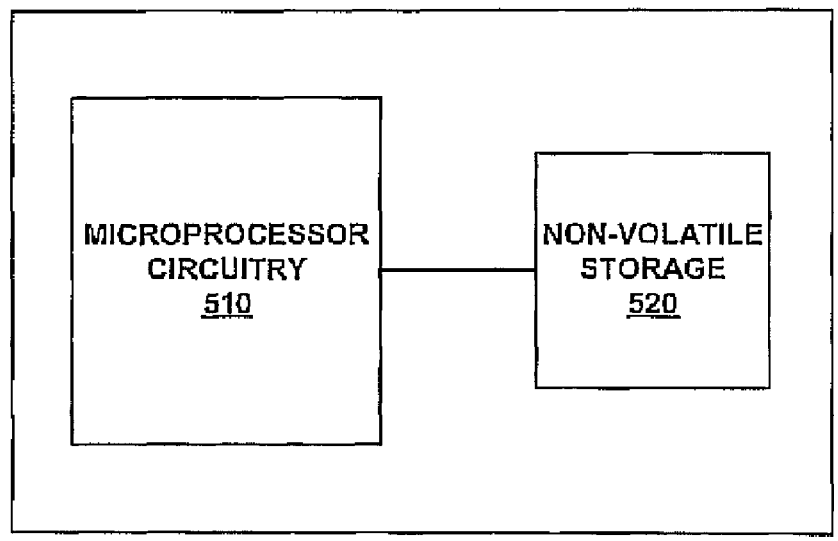
FIG. 5 illustrates an integrated circuit, in accordance with embodiments of the present invention.

FIG. 5 illustrates an integrated circuit 500, in accordance with embodiments of the present invention. Integrated circuit 500 comprises microprocessor circuitry 510 and a plurality of bits of non-volatile storage 520, e.g., memory. The plurality of bits of non-volatile storage 520 is coupled to the microprocessor circuitry and comprise information of an approximation of frequency-voltage characteristics of the microprocessor circuitry.

In accordance with other embodiments of the present invention, and as described in more detail below, the non-volatile storage 520 can comprise information of a plurality of approximations of frequency-voltage characteristics of the microprocessor circuitry at a corresponding plurality of sets of body biasing voltages.

Adaptive Control of Operating and Body Bias Voltages

Applying a body biasing voltage to a transistor device can adjust the threshold voltage of that transistor. Co-pending commonly-owned U.S. patent application Ser. No. 10/334,272 filed Dec. 31, 2002, entitled "Diagonal Deep Well Region for Routing Body-Bias Voltage for MOSFETs in Surface Well Regions" to Pelham and Burr, incorporated herein by reference in its entirety, describes exemplary systems and methods of coupling such body biasing voltages to transistors of an integrated circuit device, e.g., a microprocessor.

Changing a threshold voltage of a transistor can have numerous benefits. For example, an increase in threshold voltage generally corresponds to a beneficial decrease in leakage current and static power consumption of a transistor. Decreases in threshold voltage can sometimes also be advantageous, generally corresponding to a beneficial increase in operating frequency of a transistor.

Figure 6:
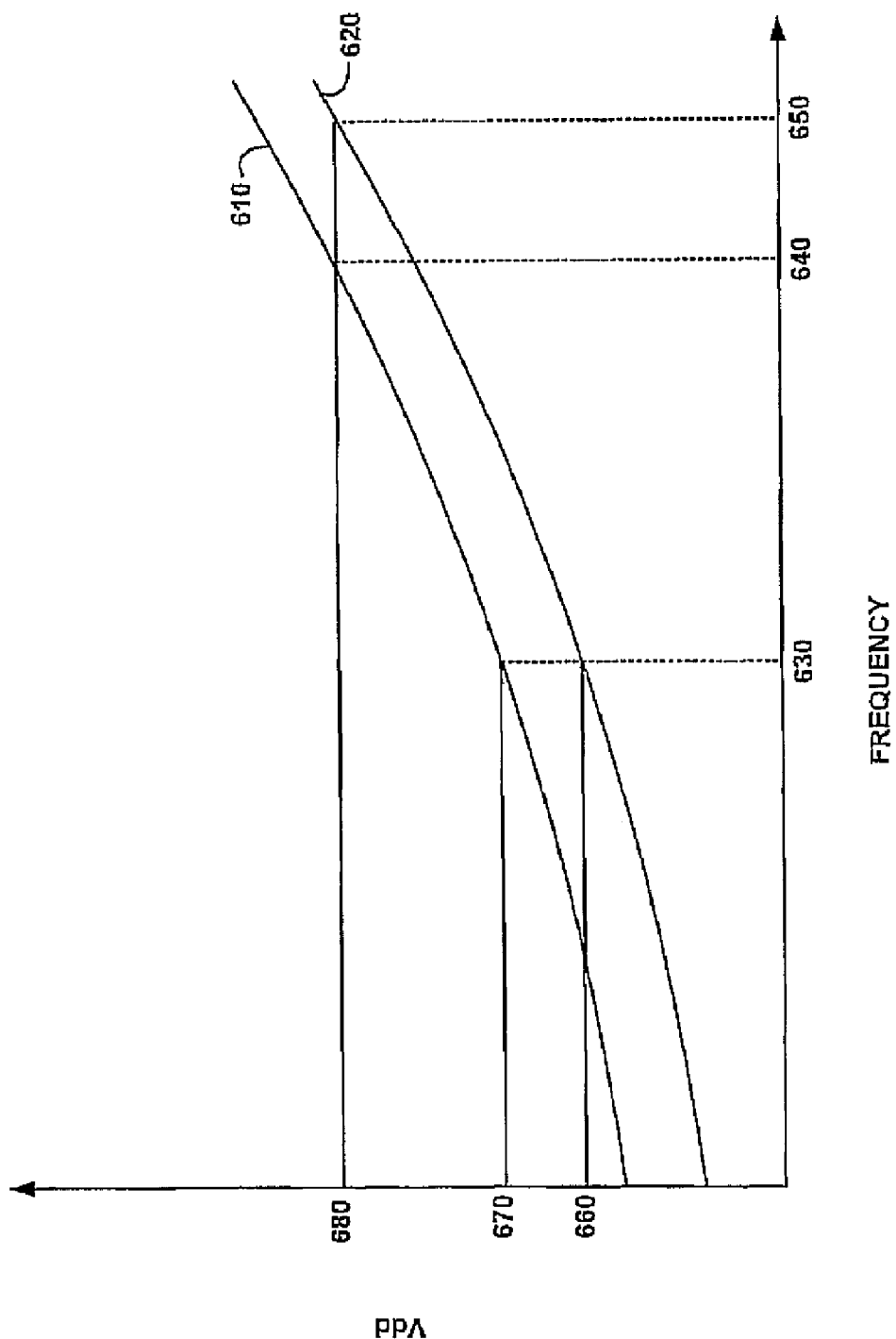
FIG. 6 illustrates exemplary frequency-voltage characteristics of a specific integrated circuit, in accordance with embodiments of the present invention.

FIG. 6 illustrates exemplary frequency-voltage characteristics of a specific integrated circuit, in accordance with embodiments of the present invention. It is to be appreciated that the frequency-voltage characteristics in FIG. 6 are presented with reversed axes relative to those of FIG. 1.

Curve 610 of FIG. 6 represents a frequency-voltage characteristic of a particular integrated circuit, e.g., a microprocessor, at a first set of body biasing conditions. For example, a body bias voltage of 3 volts can be applied to n-wells of the integrated circuit to bias p-FETs and/or a body bias voltage of −2 volts can be applied to p-wells of the integrated circuit to bias n-FETs. It is to be appreciated that body biasing voltages can be applied to both types of transistors or to only a single type of transistor, e.g., only to p-FETs or only to n-FETS. Consequently, a "set" of body biasing voltages can comprise only a single voltage. It is further appreciated that such a set can comprise body biasing voltage(s) that would not actually bias transistors, e.g., zero volts. Such embodiments are considered within the scope of the present invention.

Curve 620 of FIG. 6 represents a frequency-voltage characteristic of the same integrated circuit at a second set of body biasing conditions. For example, a body bias voltage of 0 volts can be applied to n-wells of the integrated circuit to bias p-FETs and/or a body bias voltage of 0 volts can be applied to p-wells of the integrated circuit to bias n-FETs.

In accordance with embodiments of the present invention, curve 610 represents an "efficiency" mode of operation for the particular integrated circuit. For example, in order to operate the specific semiconductor at a desired frequency, operating the semiconductor at the first set of body biasing conditions and at the operating voltage given by curve 610 will produce a low power mode of operation of the particular integrated circuit. Curve 610 is determined as a result of a test process performed on the particular integrated circuit, e.g., during a manufacturing test process.

In accordance with embodiments of the present invention, curve 620 represents a "performance" mode of operation for the particular integrated circuit. For example, in order to operate the specific semiconductor at a desired frequency, operating the semiconductor at the second set of body biasing conditions and at the operating voltage given by curve 620 will enable the particular integrated circuit to operate at a high frequency. Curve 620 is determined as a result of a test process performed on the particular integrated circuit, e.g., during a manufacturing test process.

For example, in order to operate the particular integrated circuit at frequency 630, curve 610 indicates that a low power mode of operation can be achieved if the integrated circuit is operated at operating voltage 670 and the first set of body biasing conditions. Such operating conditions consume less power at frequency 630 than operating at the second set of body biasing conditions and at operating voltage 660, as indicated by curve 610. Such lower power operation can be influenced by a number of factors, e.g., decreased leakage current.

In accordance with embodiments of the present invention, an integrated circuit operating according for curve 620 and the second set of body biasing conditions is generally capable of operating at a higher frequency for a given voltage than the same integrated circuit operating according to curve 610 and the first set of body biasing conditions.

For example, an integrated circuit is generally specified for operation up to a maximum operating voltage. Operation at voltages in excess of such a maximum operating voltage can have numerous detrimental effects, including, e.g., decreased reliability, excessive power dissipation and/or failure. Given exemplary maximum operating voltage 680, the integrated circuit operating according to curve 620 and the second set of body biasing conditions is capable of operating at frequency 650 which is greater than frequency 640, which is the maximum frequency of operation (without exceeding maximum operating voltage 680) given by curve 610 for the first set of body biasing conditions.

Alternatively, the integrated circuit is not capable of operating at frequencies greater than frequency 640 under the first set of body biasing conditions (without exceeding maximum operating voltage 680). It is, however, capable of operating at frequencies greater than frequency 640 under the second set of body biasing conditions.

In accordance with an embodiment of the present invention, one set of body biasing conditions will produce the lowest power mode of operation for all frequencies of operation, at a given temperature. This novel and unexpected result can be used to simplify control of an integrated circuit, e.g., a microprocessor, to operate in a low power mode at a variety of operating frequencies.

It is to be appreciated that that it may be desirable to operate an integrated circuit in accordance with other frequency-voltage characteristics. For example, operation according to a frequency-voltage characteristic that falls between an "efficiency" characteristic and a "max performance" characteristic may represent an attractive compromise between such "extreme" characteristics. For example, operation according to a "compromise" frequency-voltage characteristic may enable operation across a required range of operating frequencies without a need to change biasing voltage(s) and/or operating characteristics.

Figure 7:
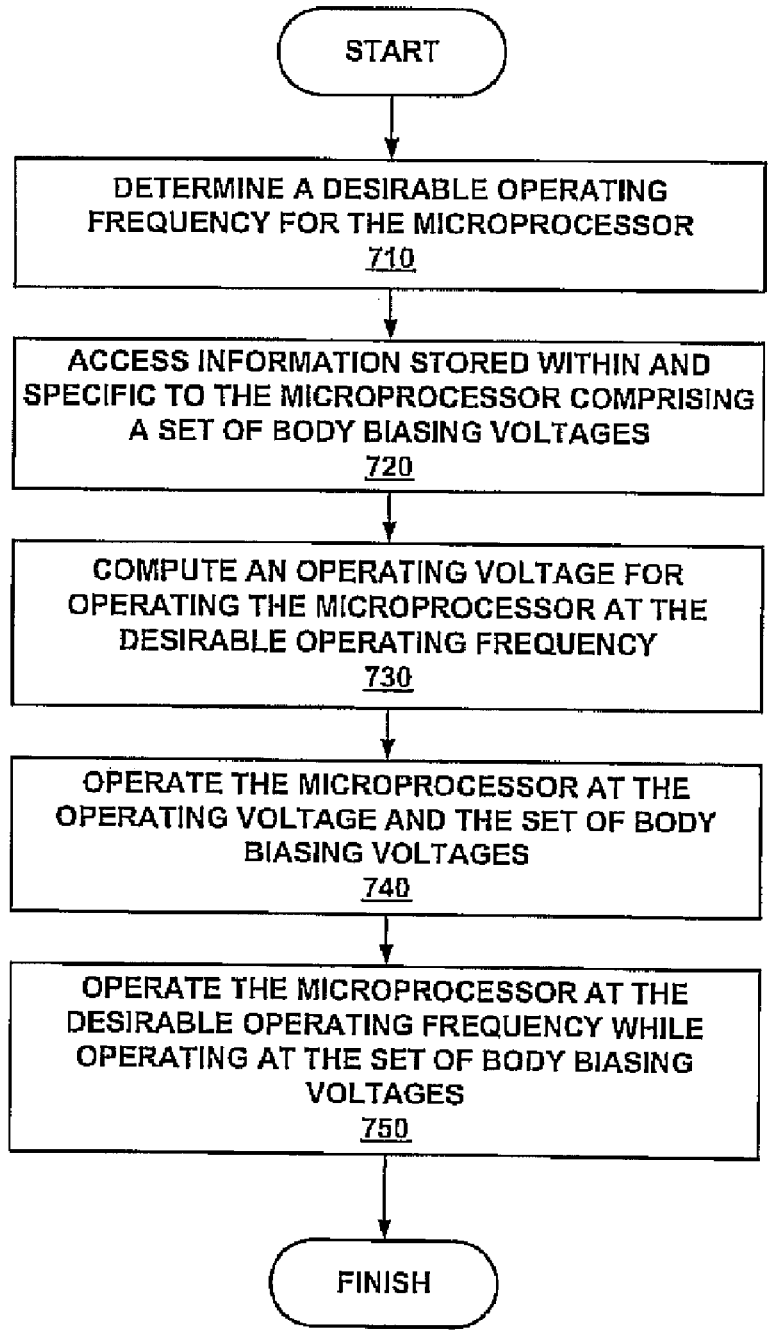
FIG. 7 illustrates a method of operating a microprocessor, in accordance with embodiments of the present invention.

FIG. 7 illustrates a method 700 of operating a microprocessor, in accordance with embodiments of the present invention. In block 710, a desirable operating frequency for the microprocessor is determined. The desirable operating frequency can be determined, for example, based upon a processing load of the microprocessor. In block 720, information stored within and specific to the microprocessor is accessed. The information comprises a set of body biasing voltages. It is appreciated that such a set can comprise a single body biasing voltage. It is further appreciated that such a set can comprise body biasing voltage(s) that would not actually bias transistors, e.g., zero volts.

In block 730, an operating voltage for operating the microprocessor at the desirable operating frequency is computed utilizing the information. In block 740, the microprocessor is operated at the operating voltage and the set of body biasing voltages. In optional block 750, the microprocessor is operated at the desirable operating frequency while operating at the operating voltage and the set of body biasing voltages.

Figure 8:
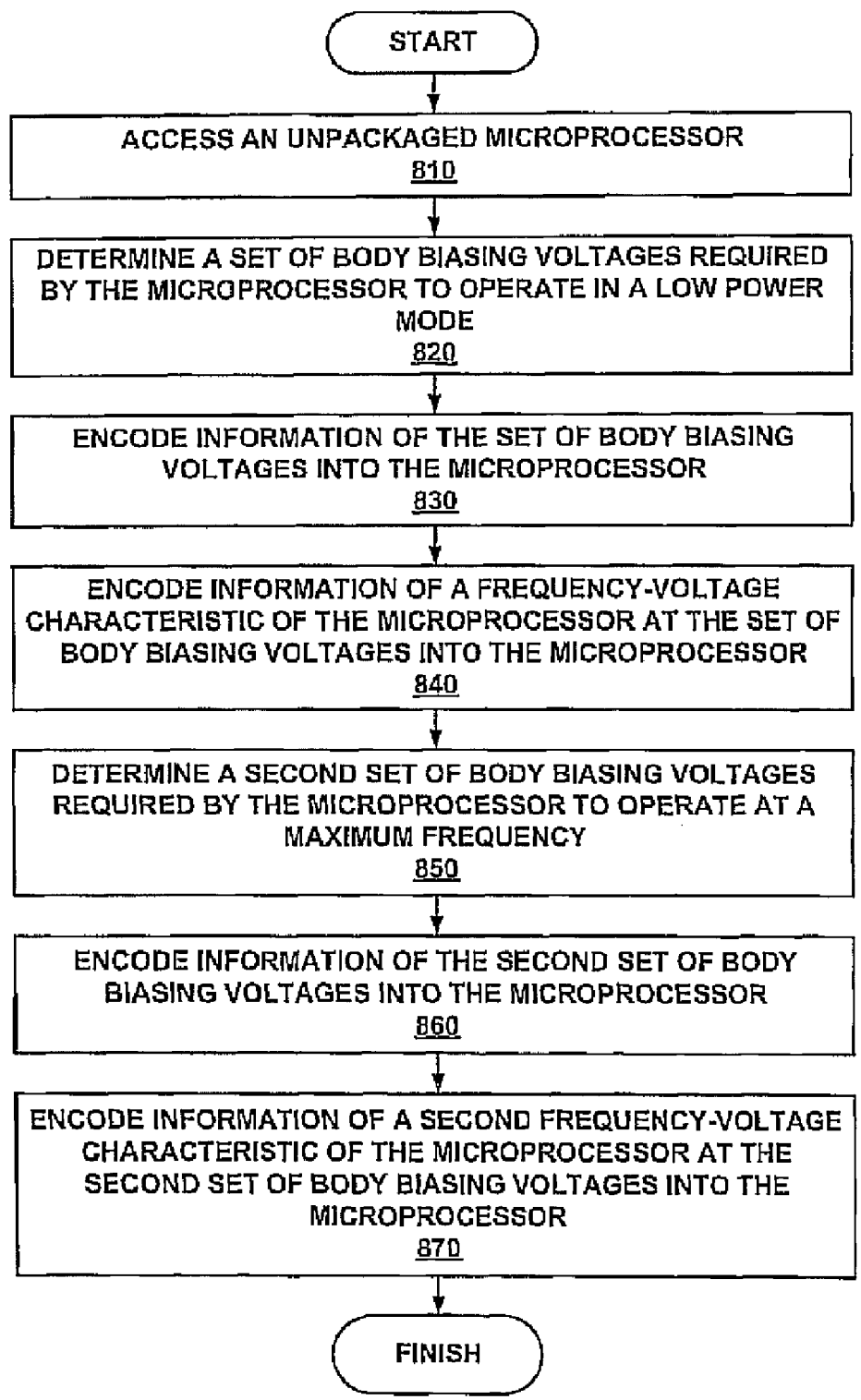
FIG. 8 illustrates a process of manufacturing an integrated circuit, in accordance with embodiments of the present invention.

FIG. 8 illustrates a process 800 of manufacturing an integrated circuit, in accordance with embodiments of the present invention. In block 810, an unpackaged microprocessor is accessed. In block 820, a set of body biasing voltages required by the microprocessor to operate in a low power mode is determined. Exemplary sets of body biasing voltages can include, for example, a body biasing voltage applied to NMOS devices and/or a body biasing voltage applied to PMOS devices.

In block 830, information of the set of body biasing voltages is encoded into the microprocessor. In optional block 840, information of a frequency-voltage characteristic of the microprocessor at the set of body biasing voltages is encoded into the microprocessor.

In optional block 850, a second set of body biasing voltages required by the microprocessor to operate at a maximum frequency is determined. In optional block 860, information of the second set of body biasing voltages is encoded into the microprocessor. In optional block 870, information of a second frequency-voltage characteristic of the microprocessor at the second set of body biasing voltages is encoded into the microprocessor.

Figure 9:
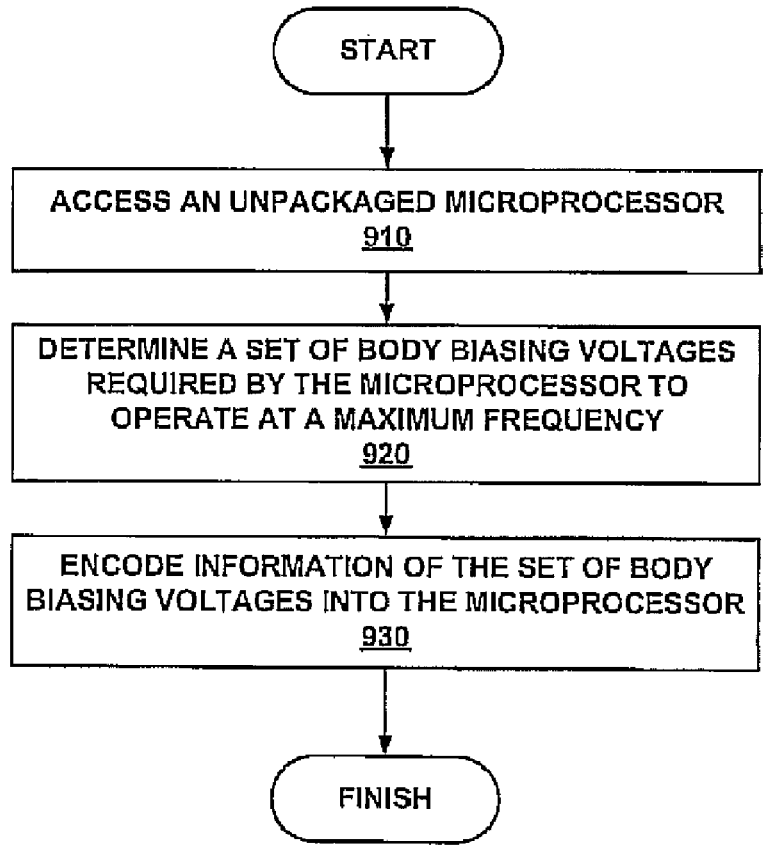
FIG. 9 illustrates a process of manufacturing an integrated circuit, in accordance with embodiments of the present invention.

FIG. 9 illustrates a process 900 of manufacturing an integrated circuit, in accordance with embodiments of the present invention. In block 910, an unpackaged microprocessor is accessed. In block 920, a set of body biasing voltages required by the microprocessor to operate at a maximum frequency is determined. In block 930, information of the set of body biasing voltages is encoded into the microprocessor.

Table 2, below, illustrates exemplary values of parameters discussed previously, as they might be encoded in non-volatile memory, e.g., data storage fuses, of an integrated circuit. Units are included parenthetically for explanation; it is appreciated that such units are generally not included in a non-volatile memory structure.

TABLE 2

| Parameter | Efficiency Mode Value | Performance Mode Value |
|---|---|---|
| Body Bias (n, p) | (3, −2) (V) | (0, 0) (V) |
| Predicted Maximum Frequency | 900 (MHz) | 1200 (MHz) |
| Voltage for Predicted Maximum Frequency | 1200 (mV) | 1350 (mV) |
| Coefficient "a" | 0.000540 | 0.000508 |
| Coefficient "b" | 0.10200 | 0.10314 |
| Frequency Guardband | 3 (%) | 3 (%) |
| Conservation Factor | 3 | 3 |

The common entries in Table 2 are as described previously for Table 1. An addition entry represents information of body bias voltages or conditions corresponding to the quadratic approximations of frequency-voltage characteristics of an integrated circuit for the given body bias voltages.

Relation 2, above, can be utilized to compute an operating voltage at the given body bias voltages utilizing parameters from Table 2 as previously described.

Figure 4:
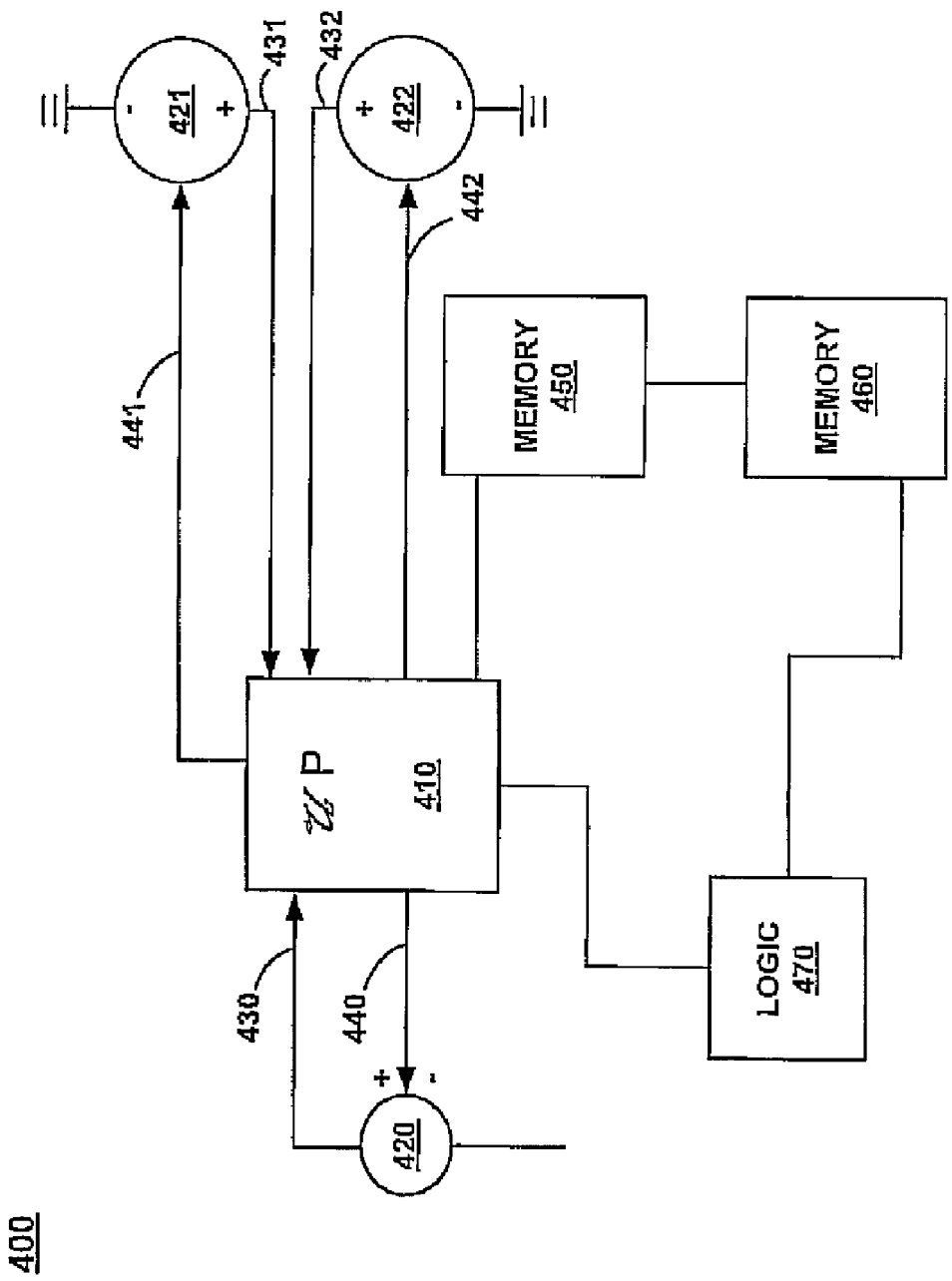
FIG. 4 illustrates a device, according to an embodiment of the present invention.

FIG. 4 illustrates a device 400, according to an embodiment of the present invention. Device 400 may form a computer, or portions thereof, e.g., a computer motherboard. Device 400 comprises a microprocessor 410 and a memory space 450. Microprocessor 410 is capable of operating at a plurality of voltages and further capable of operating at a plurality of frequencies.

Memory space 450 is coupled to microprocessor 410. Memory space 450 is well suited to a wide variety of well known types of memory, including without limitation internal RAM or ROM within microprocessor 410, RAM or ROM outside of microprocessor 410 and other forms of computer readable media.

Operating voltage supply 420 is coupled to microprocessor 410. Voltage supply 420 furnishes a selectable operating voltage 430 to microprocessor 410. Microprocessor 410 is coupled to operating voltage supply 420 via coupling 440, in order to cause voltage supply 420 to select a desired voltage.

Device 400 further comprises a plurality of voltage supplies, e.g., voltage supplies 421 and 422, coupled to the microprocessor integrated circuit for furnishing a set of selectable body biasing voltages. Commands are sent to the voltage supplies, e.g., via couplings, e.g., 441, 442. The body biasing voltage(s) are supplied via couplings, e.g., 431 and 432.

According to an alternative embodiment of the present invention, device 400 may further comprise memory space 460. Memory space 460 is coupled to microprocessor 410, for example via the same coupling means as memory space 450. Memory space 460 is well suited to similar types of memory as previously described for memory 450, and is further well suited to being within the same physical device as memory space 450. However, memory space 460 is not required to be in the same physical device as memory space 450, and some optimizations of computer 400 may preferentially separate the two memories by type and/or device.

According to another alternative embodiment of the present invention, device 400 may comprise logic 470. Logic 470 is coupled to memory 460 and microprocessor 410. Logic 470 accesses a desired frequency of operation, which may be determined by microprocessor 410, and uses memory 460 to determine a corresponding voltage. Logic 470 causes microprocessor 410 to operate at the desired frequency of operation and at the corresponding voltage. Logic 470 is well suited to software embodiments executing, for example, on microprocessor 410. Logic 470 may also execute on a second processor (not shown), or comprise a functional set of gates and/or latches. Logic 470 is well suited to being internal or external to microprocessor 410.

Figure 10:
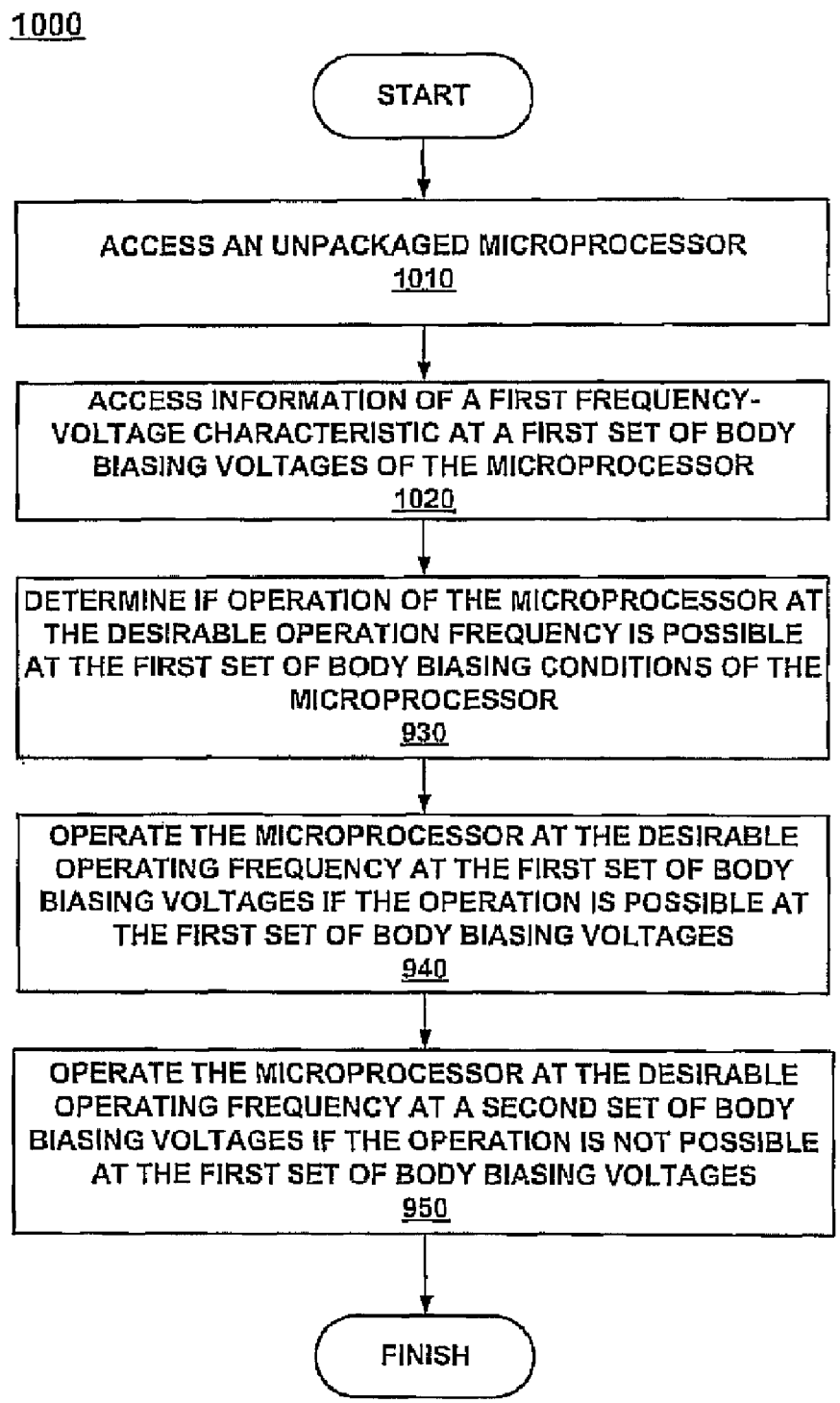
FIG. 10 illustrates a method of operating a microprocessor, in accordance with embodiments of the present invention.
Figure 10:
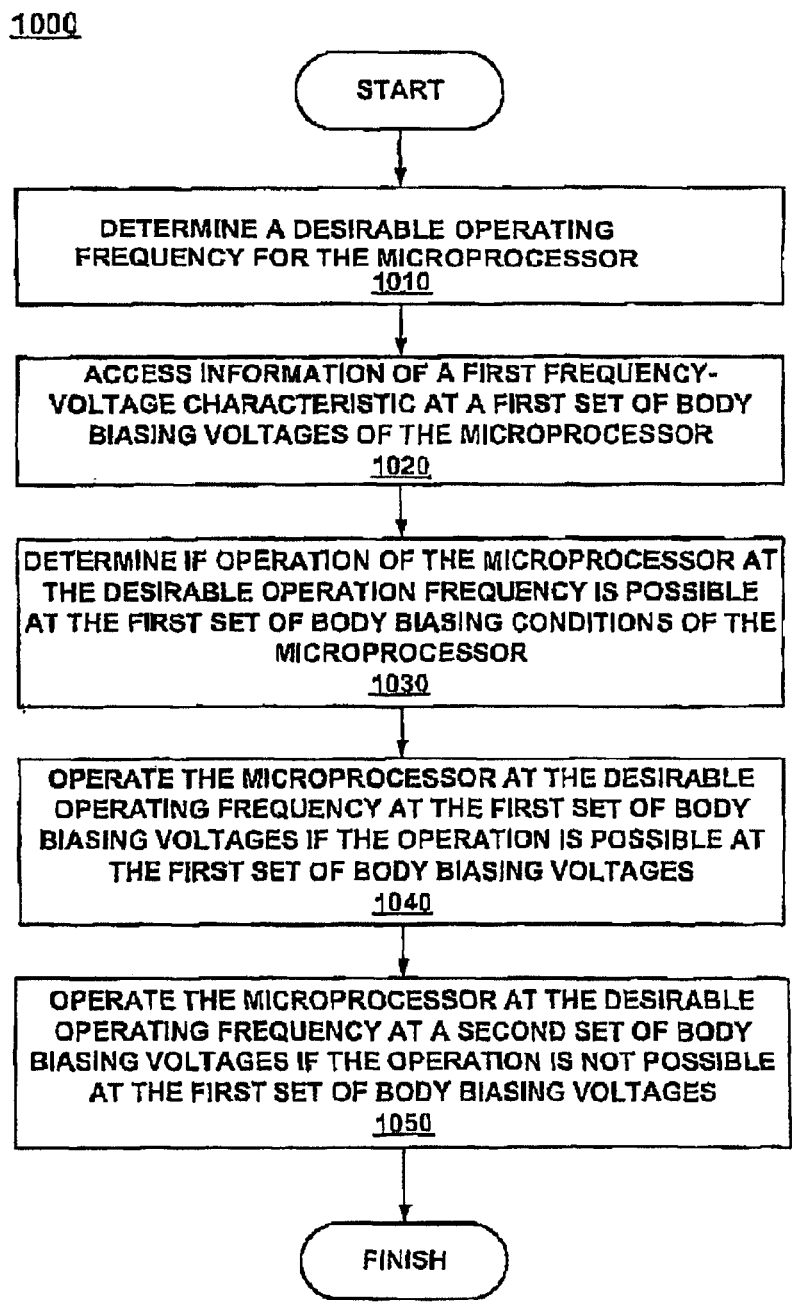

FIG. 10 illustrates a method 1000 of operating a microprocessor, in accordance with embodiments of the present invention. In block 1010, a desirable operating frequency for the microprocessor is determined. In block 1020, information of a first frequency-voltage characteristic at a first set of body biasing voltages of the microprocessor is accessed.

In block 1030, it is determined if operation of said microprocessor at the desirable operating frequency is possible at the first set of body biasing conditions.

In optional block 1040, the microprocessor is operated at the desirable operating frequency at the first set of body biasing conditions if the operation is possible at the first set of body biasing conditions.

In optional block 1050, the microprocessor is operated at the desirable operating frequency at a second set of body biasing conditions if the operation is not possible at the first set of body biasing conditions.

Embodiments in accordance with the present invention provide for determining controlling parameters, e.g., operating voltage and/or body biasing voltage(s), of an integrated circuit that enable efficient, e.g., low power, as well as high frequency operation of the integrated circuit based upon characteristics of that specific integrated circuit. In this manner, the integrated circuit can be operated more efficiently that in accordance with the conventional art.

Embodiments in accordance with the present invention, adaptive control of operating and body bias voltages, are thus described. While the present invention has been described in particular embodiments, it should be appreciated that the present invention should not be construed as limited by such embodiments, but rather construed according to the below claims.

What is claimed is:

1. A method of manufacturing a microprocessor comprising:
   accessing an unpackaged microprocessor;
   determining a set of body biasing voltages to be used by said microprocessor to operate in a low power mode; and
   encoding information of said set of body biasing voltages into said microprocessor.

2. The method as described in claim 1 further comprising encoding information of a frequency-voltage characteristic of said microprocessor at said set of body biasing voltages into said microprocessor.

3. The method as described in claim 1 further comprising determining a second set of body biasing voltages required by said microprocessor to operate at a maximum frequency.

4. The method as described in claim 3 further comprising encoding information of said second set of body biasing voltages into said microprocessor.

5. The method as described in claim 4 further comprising encoding information of a second frequency-voltage characteristic of said microprocessor at said second set of body biasing voltages into said microprocessor.

6. The method as described in claim 5 wherein said determining is performed prior to packaging said microprocessor.

7. The method as described in claim 6 wherein said determining is performed at a wafer level.

8. The method as described in claim 7 wherein said encoding is also performed at said wafer level.

9. A method of manufacturing a microprocessor comprising:
- accessing an unpackaged microprocessor;
- determining a set of body biasing voltages to be used by said microprocessor to operate at a maximum frequency; and
- encoding information of said set of body biasing voltages into said microprocessor.

10. The method as described in claim 9 wherein said determining is performed prior to packaging said microprocessor.

11. The method as described in claim 9 wherein said determining is performed at a wafer level.

12. The method as described in claim 11 wherein said encoding is also performed at said wafer level.

* * * * *

UNITED STATES PATENT AND TRADEMARK OFFICE
CERTIFICATE OF CORRECTION

| | |
|---|---|
| PATENT NO. | : 8,370,658 B2 |
| APPLICATION NO. | : 12/502902 |
| DATED | : February 5, 2013 |
| INVENTOR(S) | : Sheng et al. |

It is certified that error appears in the above-identified patent and that said Letters Patent is hereby corrected as shown below:

On Title Page 3, in Item (56), under "FOREIGN PATENT DOCUMENTS", in Column 1, Line 4, delete "0976781" and insert -- 0978781 --, therefor.

In the Drawings

In Fig. 10, Sheet 10 of 10, replace the figure with attached Replacement Sheet.

In the Specification

In Column 12, Line 1, delete "that that it" and insert -- that it --, therefor.

Signed and Sealed this
Seventeenth Day of June, 2014

Michelle K. Lee
*Deputy Director of the United States Patent and Trademark Office*